Figure 1:
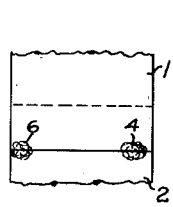

Dec. 9, 1941.         H. O. QUARTZ         2,265,954
METHOD OF WELDING
Filed July 27, 1940

Inventor
H. O. Quartz
by
Attorney

Patented Dec. 9, 1941

2,265,954

UNITED STATES PATENT OFFICE 2,265,954

METHOD OF WELDING

Herbert O. Quartz, West Allis, Wis., assignor to Allis-Chalmers Manufacturing Company, Milwaukee, Wis., a corporation of Delaware Application July 27, 1940, Serial No. 347,831

6 Claims. (Cl. 219—10)

This invention relates to a method of welding and more particularly to a method of electric arc welding together portions of adjacent objects disposed in welding proximity.

The known procedure in skip welding together portions of adjacent objects disposed in welding proximity with an electric arc, i. e., by means of a series of spaced spot welds, is to strike an arc between the free end of the electrode and the work and to then move the electrode to a position such that a stable metal depositing or metal carrying arc is maintained between the free end of the electrode and the work. The electrode is thereafter held in this position until the requisite quantity of weld metal has been deposited and fused with the work whereupon the electrode is withdrawn from the work and the arc extinguished. However, if a spot weld of appreciable length is desired, the electrode, when positioned in the welding relation just described, is slowly moved in parallel relation with respect to the work until a weld of the desired length is obtained before the arc is withdrawn from the work and extinguished. The electrode is then moved to a new position, the arc reestablished and the just described procedure repeated until the spot welding of the objects is completed. This procedure, while satisfactory insofar as the actual weld itself is concerned, is objectionable in that considerable time is consumed in establishing the arc in each instance which time is in effect a total waste and materially decreases the number of satisfactory welds that can be made in a specified time.

A somewhat similar procedure has heretofore been employed in arc welding vertically extending joints. For example, the known procedure in this connection is to establish an arc between the electrode and the work, to move the electrode to a position such that a stable metal depositing or metal carrying arc is maintained between the electrode and the work, to slowly move the electrode upward along the work in substantially parallel relation until metal commences to flow or drop downward due to its fluidity and gravity action whereupon the electrode is withdrawn from the work and the arc extinguished. The welding of the work is thereupon discontinued until the metal on the work solidifies whereupon the just described procedure is repeated until the welding of the work is completed. This procedure, while entirely satisfactory insofar as the actual weld itself is concerned, is also objectionable in that considerable time is consumed in re-establishing the arc in each instance which time is, in effect, a total waste and materially decreases the length of weld that can be made in a specified time.

It is therefore an object of this invention to provide an improved method of electric arc welding which entirely eliminates the aforementioned objectionable features.

Another object of this invention is to provide an improved method of electric arc welding in that successive time interval spaced welding operations are made without extinguishing the arc.

Still another object of this invention is to provide an improved method of welding in that alternate welding and heating operations are performed with an electric arc.

A further object of this invention is to provide an improved method of producing vertically extending continuous electric arc welds.

Figure 2:
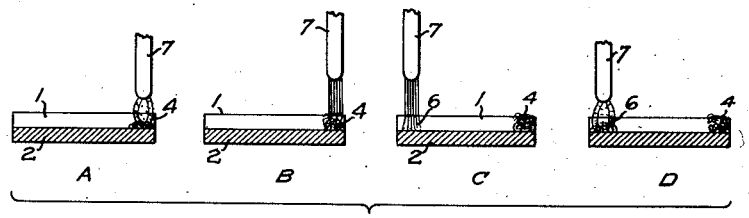
Figure 3:
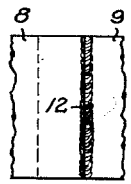
Figure 4:
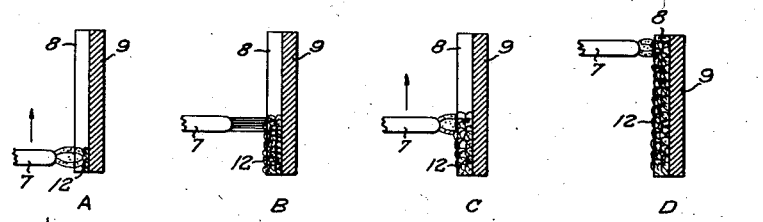
Figure 5:
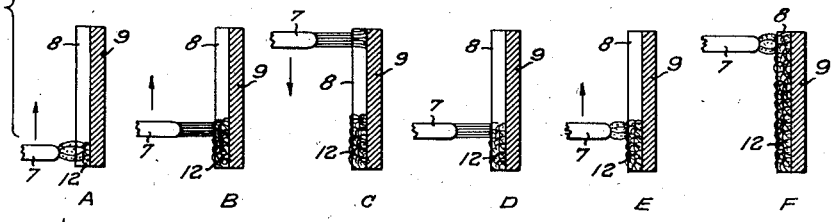

The invention accordingly consists of the various methods or processes of electric arc welding as more particularly set forth in the appended claims and in the detailed description, in which:

Fig. 1 illustrates a lap joint which has been skip welded in accordance with this invention;

Fig. 2, views A—D, inclusive, illustrates the steps of skip welding a lap joint in accordance with this invention;

Fig. 3 illustrates a vertically extending lap joint provided with a continuous weld which is coextensive with the length of the joint and which has been made in accordance with this invention;

Fig. 4, views A—D, inclusive, illustrates the steps of one method of making the continuous weld shown in Fig. 3; and Fig. 5, views A—F, inclusive, illustrates the steps of another method of making the continuous weld shown in Fig. 3.

Referring to Figs. 1 and 2, it is seen that the invention is disclosed by way of illustration in connection with the welding together of two parallel and horizontally extending plates 1 and 2 having their adjacent end portions arranged in overlapping relation preparatory to forming a common lap joint. The joint is completed by skip welding together the overlapping ends of the plates 1 and 2 at two spaced points or portions designated 4 and 6.

The spaced welds 4 and 6 are formed by a series of time interval spaced electric arc welding operations using a continuous arc as best shown in Fig. 2, views A—D, inclusive. Fig. 2, view A, illustrates the first step which consists in establishing a stable metal-depositing and metal fusing arc between the movable electrode 7 and the work or other electrode, which in this illustration consists of the overlapping ends of the plates 1 and 2, at the point or portion 4 and maintaining the electrode in the approximate position shown, i. e., in its stable metal-depositing and metal-fusing arc relation with respect to the work until the portion 4 has been welded to the desired extent. The next welding operation is performed as illustrated by Fig. 2, views B—D, inclusive, by first withdrawing the electrode 7 from the portion 4 of the work a distance sufficient to establish a stable non-metal depositing and non-metal fusing arc between the electrode 7 and the work (see Fig. 2, view B), then moving the electrode 7 to the left while maintaining the electrode 7 in its non-metal depositing and non-metal fusing arc relation with respect to the work until the electrode 7 is directly over the portion 6, as shown in Fig. 2, view C, then moving the electrode 7 toward the portion 6 of the work a sufficient distance to establish a stable metal depositing and metal fusing arc between the electrode 7 and the portion 6, as shown in Fig. 2, view D, and holding the electrode 7 in this position until the portion 6 has been welded to the desired extent. If additional spaced portions are to be welded, the above described procedure is repeated which permits a series of time interval spaced electric arc welding operations to be performed without extinguishing the arc which in turn eliminates the needless waste of time consumed in striking or reestablishing the arc each time a welding operation is to be performed by the known procedure heretofore practiced. This procedure also permits preheating to a beneficial degree the successive portions to be spot welded as the electrode may be held in its non-metal depositing and non-metal fusing relation with respect to the work as shown in Fig. 2, view C, until the desired degree of heating is effected before the electrode is moved toward the work to establish a stable metal depositing and metal fusing arc.

Referring to Figs. 3 and 4, it is seen that the invention is also of particular importance in connection with the welding of vertically extending surfaces and particularly with respect to vertically extending continuous welds of such length that a series of time interval spaced welding operations must be performed in order to prevent molten metal from flowing or dropping from the work due to its fluiding and gravity action. Fig. 3 shows two vertically extending plates 8 and 9 having their adjacent ends disposed in overlapping relation and permanently joined together by a continuous and coextensive electric arc weld 12. The continuous weld 12 is also formed by a series of time interval spaced electric arc welding operations without extinguishing the arc, as best shown in Fig. 4, views A—D, inclusive. Fig. 4, view A, illustrates the first step which consists in establishing a stable metal depositing and metal fusing arc between the movable electrode 7 and the lower end of the work or other electrode which in this illustration consists of the overlapping portions of the plates 8 and 9 and gradually moving the electrode upward along the work while maintaining the electrode in its stable metal depositing and metal fusing arc relation with respect to the work until metal is about to flow or drop from the work due to its fluidity and gravity action. The electrode 7 is then immediately withdrawn from the work a sufficient distance to establish a stable non-metal depositing and non-metal fusing arc between the electrode and the work, as shown by Fig. 4, view B, and held in this position until the weld metal which has been deposited has solidified. Next the electrode 7 is moved toward the work a sufficient distance to reestablish a stable metal depositing and metal-fusing arc between the electrode and the work, as shown in Fig. 4, view C, and then moving the electrode slowly upward along the work in order to complete the continuous weld, as indicated in Fig. 4, view D. The speed at which the electrode is moved upward along the work will depend upon the nature of the weld that is to be formed. However, the length of weld that can be completed before the electrode 7 must be withdrawn in order to prevent metal from flowing or dropping from the weld, will, of course, depend primarily upon the degree of inclination of the surfaces to be welded and also upon the thickness and the nature of the work material. If the length to be welded is such that a continuous weld cannot be performed in two welding operations, as previously described, the above described procedure is repeated the necessary number of times. This procedure also eliminates the needless waste of time consumed in striking or reestablishing the arc each time a welding operation is performed by the methods heretofore practiced.

Fig. 5, view A—F, inclusive, illustrates another manner of welding vertically extending surfaces in accordance with this invention. This procedure which is shown in connection with the formation of the continuous coextensive weld 12 of Fig. 3 differs from that illustrated by Fig. 4, views A—D, inclusive, in that when the electrode 7 is withdrawn from the work a sufficient distance to establish a non-metal depositing and non-metal fusing arc between the electrode and the work in order to prevent metal from flowing or dropping from the work due to its fluidity and gravity action (as shown in view B of Figs. 4 and 5), the electrode 7 is then moved upward along the work while maintaining the electrode in its non-metal depositing and non-metal-fusing arc relation with respect to the work a distance approximately equal to the length of weld that can be made during the next welding operation, as shown in Fig. 5, view C, and back to the point at which the electrode was withdrawn from the work to establish the non-metal depositing and non-metal fusing arc, as shown in Fig. 5, view D. This difference in procedure operates to preheat the portion of the work which is to be next welded and at the same time permits a more rapid solidification of the weld metal previously deposited than is obtained by the procedure illustrated by Fig. 4, views A—D, inclusive. The electrode is then moved toward the work to reestablish a stable metal depositing and metal-fusing between the electrode and the work as shown in Fig. 5, view E. The continuous weld is then completed by moving the electrode 7 upward along the work while maintaining the electrode in its stable metal-depositing and metal fusing arc relation with respect to the work as indicated by view F of Fig. 5.

This modified procedure also materially reduces the time required to perform a specified number of time interval spaced electric arc welding operations and in addition, effects a better weld since the work is preheated to a beneficial extent prior to each succeeding welding operation. Of course, the number of welding operations that must be performed in order to completely weld a vertically extending surface depends upon the degree of inclination, the extent, and the nature of the surface which is to be welded. This modified procedure is also particularly adapted for providing a continuous weld on any surface or work with respect to which it is desired to effect alternate welding and heating operations by means of an electric arc in order to produce a weld having improved physical characteristics.

Apparatus which is satisfactory for practicing the herein described procedures must be capable of maintaining a stable metal depositing and metal fusing arc between a pair of electrodes, one of which constitutes the work to be welded, when the spacing between said electrodes does not exceed a predetermined distance and in addition must be capable of maintaining a stable non-metal depositing and non-metal fusing arc between the said electrodes when the movable electrode is withdrawn from the work an appreciable distance beyond said predetermined distance. The last mentioned operation of the apparatus is of particular importance in order to avoid a critical operating condition and frequent interruptions of the arc. The herein described procedures have been successfully performed without experiencing arc interruptions using the known Weld-O-Tron electric arc welding apparatus which is now available on the market and which is fully disclosed in the copending application of Donald B. Scott, Serial No. 345,032, filed July 12, 1940. For example, extremely thin steel sheets were welded together in accordance with the three procedures herein disclosed, using the Weld-O-Tron apparatus with a 3/64" electrode and a welding current of approximately five amperes. With the apparatus adjusted to produce a current ranging from five to thirty-five amperes, a stable metal depositing and metal fusing arc was maintained between the electrode and the work when the electrode was withdrawn from the work a distance of as much as three thirty-seconds of an inch and a stable non-metal depositing and non-metal fusing arc was maintained when the electrode was withdrawn from the work a further distance ranging from one thirty-second to one-eighth of an inch in addition to the initial withdrawal of three thirty-seconds of an inch previously mentioned. The same procedures were also successfully employed in welding thicker plates with the same apparatus adjusted to produce a higher current range. Under these last mentioned conditions, the arc length could be made as much as one-eighth of an inch during the transfer of metal to form a weld, i. e., while maintaining a stable metal depositing and metal fusing arc between the movable electrodes and the work, and up to one-half inch during operation without transfer of metal, i. e., while maintaining a stable non-metal depositing and non-metal fusing arc between the movable electrode and the work. When the movable electrode is in its non-metal depositing and non-metal fusing arc relation with respect to the work, some of the electrode metal may, however, slowly melt to form occasional drops which are separated from the rod by gravity, but with the electrode in this position no metal is carried or transferred to the work by the arc.

Consequently, it should be understood that the statements "non-metal depositing and non-metal fusing arc" and "metal depositing and metal fusing arc" herein used are to be construed to mean that no metal is carried from the electrode to work and fused therewith by the action of the arc and that metal is carried from the electrode to the work and fused therewith by the action of the arc, respectively. Furthermore, it should be understood that any apparatus having the requisite arc characteristics previously pointed out may be used for practicing the herein disclosed procedures, that while the invention has been disclosed in connection with the electric arc welding of lap joints by way of illustration, the invention is of general application and may be used wherever a series of time interval spaced electric arc welding operations are to be performed, and that it is not intended to limit the invention to the exact procedures herein shown and disclosed, as various modifications within the scope of the appended claims may occur to persons skilled in the art.

It is claimed and desired to secure by Letters Patent:

1. A method of producing a series of time interval spaced electric arc welding operations which comprises establishing a stable metal depositing and fusing arc between the electrode and a portion of the work which is to be welded, maintaining the electrode in its stable metal depositing and fusing arc relation with respect to the said portion of the work until that portion of the work has been welded to the desired extent, withdrawing the electrode from the work a sufficient distance to establish and maintain a stable non-metal depositing and non-fusing arc between the electrode and the work, then moving the electrode toward that portion of the work which is to be next welded a sufficient distance to establish a stable metal depositing and fusing arc between the electrode and the said next portion, and maintaining the electrode in its stable metal depositing and fusing arc relation with respect to the said next portion until the said next portion is welded to the desired extent.

2. A method of producing a series of spaced electric arc welds which comprises establishing a stable metal depositing and fusing arc between the electrode and a portion of the work which is to be welded, maintaining the electrode in its stable metal depositing and fusing arc relation with respect to that portion of the work which is to be first welded until said first portion is welded to the desired extent, withdrawing the electrode from the work a sufficient distance to establish a stable non-metal depositing and non-fusing arc between the electrode and the work, moving the electrode while maintaining the electrode in its non-metal depositing and non-fusing arc relation with respect to the work to another portion of the work which is to be welded, then moving the electrode toward the said another portion of the work a sufficient distance to establish a stable metal depositing and fusing arc between the electrode and the said another portion, and maintaining the electrode in its stable metal depositing and fusing arc relation with respect to the said another portion until the said another portion has been welded to the desired extent.

3. A method of producing a series of spaced electric arc welds which comprises establishing a stable metal depositing and fusing arc between the electrode and a portion of the work which is to be welded, maintaining the electrode in its stable metal depositing and fusing arc relation with respect to that portion of the work which is to be first welded until said first portion is welded to the desired extent, withdrawing the electrode from the work a sufficient distance to establish a stable non-metal depositing and non-fusing arc between the electrode and the work, moving the electrode while maintaining the electrode in its non-metal depositing and non-fusing arc relation with respect to the work to another portion of the work which is to be welded, holding the electrode in its non-metal depositing and non-metal fusing arc relation with respect to said another portion until the said another portion has been preheated to the desired degree, then moving the electrode toward the said another portion of the work a sufficient distance to establish a stable metal depositing and fusing arc between the electrode and the said another portion, and maintaining the electrode in its stable metal depositing and fusing arc relation with respect to the said another portion until the said another portion has been welded to the desired extent.

4. A method of producing a continuous vertically extending electric arc weld of such length that a series of welding operations must be performed in order to prevent molten metal from flowing or dropping from the weld due to its fluidity and gravity action which comprises establishing a stable metal depositing and fusing arc between the electrode and the work, moving the electrode upward along the work while maintaining the electrode in its stable metal depositing and fusing arc relation with respect to the work until the metal is about to flow or drop from the work due to its fluidity and gravity action, then withdrawing the electrode from the work a sufficient distance to establish a stable non-metal depositing and non-fusing arc between the electrode and the work, maintaining the electrode in its non-metal depositing and non-fusing arc relation with respect to the work until the weld metal which was last deposited on the work has solidified, then moving the electrode toward the work a sufficient distance to reestablish a stable metal depositing and fusing arc between the electrode and that portion of the work from which the electrode had been withdrawn, and again moving the electrode upward along the work while maintaining the electrode in its stable metal depositing and fusing arc relation with respect to the work so as to form a continuous weld.

5. A method of producing alternating welding and heating operations with an electric arc which comprises establishing a stable metal depositing and fusing arc between the electrode and the work, moving the electrode along the work while maintaining the electrode in its metal depositing and fusing arc relation with respect to the work for a predetermined distance, then withdrawing the electrode from the work a sufficient distance to establish a stable non-metal depositing and non-fusing arc between the electrode and the work, moving the electrode while maintaining the electrode in its non-metal depositing and non-fusing arc relation with respect to the work along the portion of the work which is to be next welded and then back over said portion until the electrode is again in the approximate position to which it was previously withdrawn in order to establish the non-metal depositing and non-fusing arc, then moving the electrode toward the work a sufficient distance to reestablish a stable metal depositing and fusing arc between the electrode and the work, and again moving the electrode along the work while maintaining the electrode in its stable metal depositing and fusing arc relation with respect to the work so as to form a continuous weld.

6. A method of producing a continuous vertically extending electric arc weld of such length that a series of welding operations must be performed in order to prevent molten metal from flowing or dropping from the work due to its fluidity and gravity action which comprises establishing a stable metal depositing and fusing arc between the electrode and the work, moving the electrode upward along the work while maintaining the electrode in its metal depositing and fusing arc relation with respect to the work until metal is about to flow or drop from the work due to its fluidity and gravity action, then withdrawing the electrode from the work a sufficient distance to establish a stable non-metal depositing and non-fusing arc between the electrode and the work, moving the electrode while maintaining the electrode in its non-metal depositing and non-fusing arc relation with respect to the work upward along the portion of the work which is to be next welded and then back over said portion until the electrode is again in the approximate position to which it was withdrawn when the metal was about to flow or drop from the work during the preceding welding operation, then moving the electrode toward the work a sufficient distance to reestablish a stable metal depositing and fusing arc between the electrode and the work, and again moving the electrode upward along the work while maintaining the electrode in its stable metal depositing and fusing arc relation with respect to the work so as to form a continuous weld.

HERBERT O. QUARTZ.